March 6, 1928.

E. G. GARTIN 1,661,656

CHUCK MECHANISM

Filed June 7, 1920

Inventor:
Elmer G. Gartin.
by
Horace L. Cheney
att'y.

Patented Mar. 6, 1928.

1,661,656

UNITED STATES PATENT OFFICE.

ELMER G. GARTIN, OF CLAREMONT, NEW HAMPSHIRE, ASSIGNOR TO SULLIVAN MACHINERY COMPANY, A CORPORATION OF MASSACHUSETTS.

CHUCK MECHANISM.

Application filed June 7, 1920. Serial No. 387,240.

My invention relates to chuck mechanisms and more especially to chuck mechanisms for percussive tools.

One object of my invention is to provide an improved chuck mechanism. Another object of my invention is to provide an improved chuck mechanism for percussive tools providing very simple locking means for the implements adapted to be operated on thereby. A further object of my invention is to provide an improved chuck mechanism in which improved implement locking mechanism is provided. A still further object of my invention is to provide an improved chuck mechanism in which readily replaceable tool locking mechanism is provided.

In the accompanying drawings I have shown for purposes of illustration one form which my invention may assume in practice.

In these drawings,—

Figure 1:
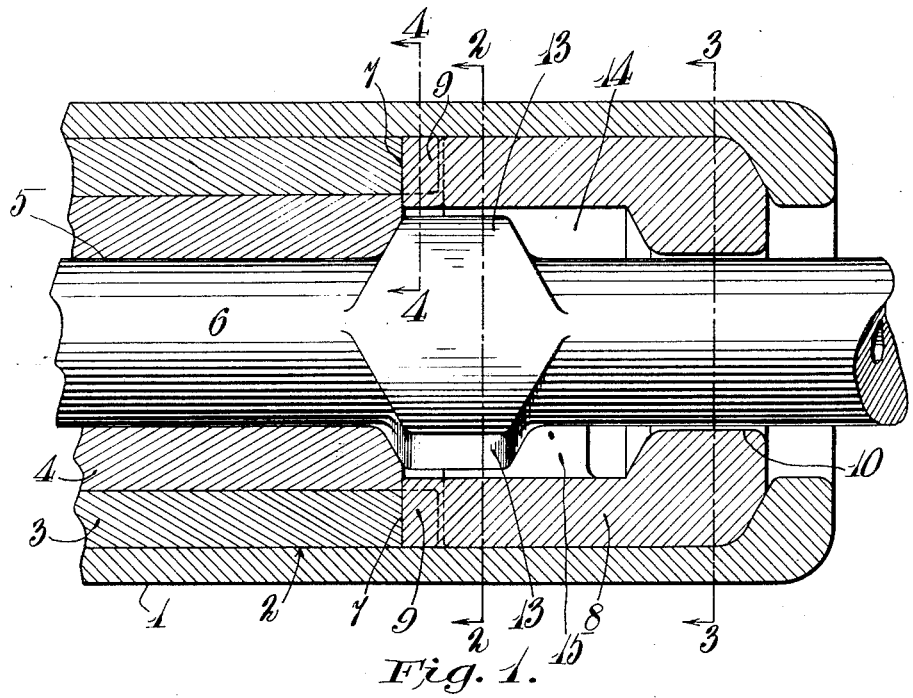
Fig. 1 is a central longitudinal section through my improved chuck mechanism showing the same with an implement, herein a drill steel, therein.
Figure 2:
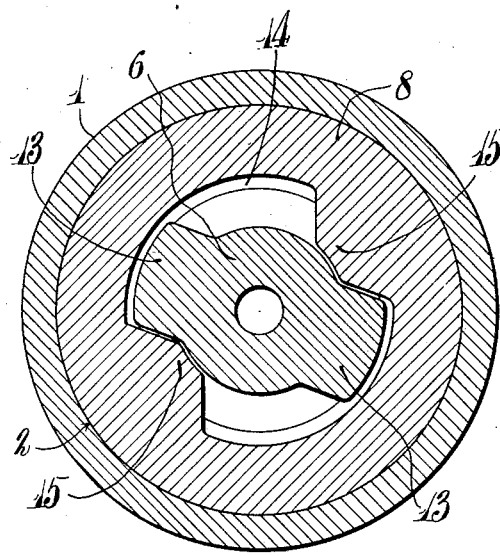
Fig. 2 is a transverse section on the line 2—2 of Fig. 1, the section being turned through 90 degrees.
Figure 3:
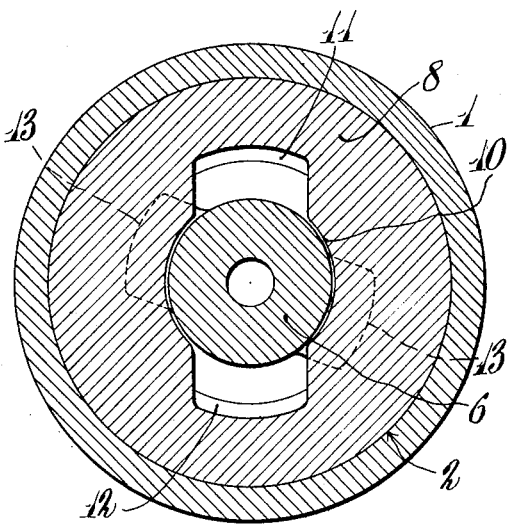
Fig. 3 is a transverse section on the line 3—3 of Fig. 1, the section being turned through 90 degrees.
Figure 4:
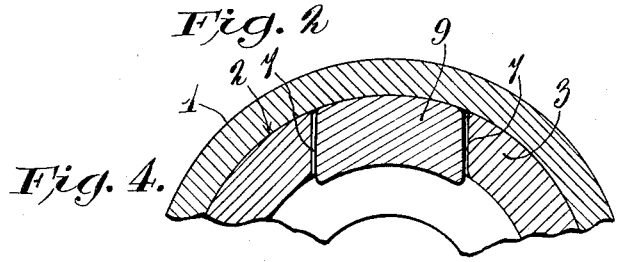
Fig. 4 is a fragmentary transverse section on the line 4—4 of Fig. 1 showing a detail of construction.

In the form of my invention which I have shown for purposes of illustration herein, the forward end of the chuck housing of a percussive tool is generally indicated by the numeral 1. Within this housing there is rotatably received a chuck rotating member generally indicated by the numeral 2 and comprising a portion 3 into which there is pressed or in some other manner suitably secured a member 4 having therein a bore 5 of a size suitable to receive the end of the drill steel 6. The member 3 is rotated in a well known manner by any suitable means. At the forward end of the member 3 a plurality of sockets or clutch jaws 7 are arranged for the purpose of locking in fixed angular position to the member 3 a tool receiving and locking chuck or driver member 8 which is provided adjacent its rear end with cooperating teeth 9 to loosely fit the sockets or jaws 7. The clutch teeth 9 are made of materially less strength, by reason of the less material in them, than the walls of the sockets 7, whereby breakage may be localized in the more readily replaceable and cheaper part. The driver member 8 is provided with a bore in alinement with the bore 5 but of different contour, this bore being indicated by the numeral 10. This bore, at its foremost portion, is provided with two enlargements 11 and 12 to permit the insertion therethrough of the lugs 13 of the drill steel 6. Rearwardly of the forward end of the member 8 an enlarged chamber 14 is provided, this chamber having a bore of the shape which would be produced by the partial revolution of a lug similar in shape to the opening of the front end of the member 8, thus leaving within the bore 14 a pair of inwardly directed wings 15 against which the lugs of the steel 6 are adapted to rest during operation.

From the foregoing description it will be obvious that I have provided a very simple means for the reception and locking of a drill steel 6, because upon insertion of the steel 6 through the opening at the front end of the member 8 and partial rotation of the member 8, or of the steel with respect to the member 8, the drill steel is locked in the chuck. It will also be obvious that I have provided a device which is very simple to manufacture, in which breakage is localized in the cheaper and simpler part, and in which, upon breakage or excessive wear of the chuck member proper, i. e. the member 8, replacement is very easy, merely involving the substitution of a new forward member and rendering unnecessary the scrapping of the relatively expensive member 2 or the difficult and sometimes unsatisfactory operation of pressing or screwing new bushings thereinto.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. A chuck mechanism comprising a rotating member and a chuck member loosely clutched thereto and provided with means for the reception and locking therein of a lugged drill steel, said member having also lug engaging portions adapted to support the lugs during rotation.

2. In a drilling mechanism, in combination, a rotating member provided adjacent its forward extremity with a plurality of sockets, and a chuck member cooperating therewith and having teeth loosely interengaging with said sockets, said chuck member being provided within its interior with a chamber for receiving the lugs of a lugged drill steel and with means for supporting the lugs during rotation of the steel.

3. In a drilling mechanism, in combination, a rotating member provided adjacent its forward extremity with a plurality of sockets, and a chuck member cooperating therewith and having teeth loosely interengaging with said sockets, said chuck member being provided within its interior with a chamber for receiving the lugs of a lugged drill steel and having an opening into said interior of less area than the cross sectional area of said chamber and means for supporting the lugs during rotation of the steel.

4. A lug chuck for fluid actuated rock drills of the hammer piston type, comprising a chuck sleeve adapted to be rotated, a cylindrical chuck bushing within the forward end of said sleeve through which the shank of a drill steel is adapted to extend in position to receive the impact blows of the hammer piston of the drill, clutch jaws formed in the chuck sleeve, and a driver for a drill steel having clutch jaws cooperating loosely with the clutch jaws in the chuck sleeve.

5. A lug chuck for fluid actuated rock drills of the hammer piston type, comprising a chuck sleeve adapted to be rotated, a cylindrical chuck bushing within the forward end of said sleeve through which the shank of a drill steel is adapted to extend in position to receive the impact blows of the hammer piston of the drill, clutch jaws formed in the clutch sleeve, and a driver for a drill steel having clutch jaws cooperating loosely with the clutch jaws in the chuck sleeve, said driver having a recess and internal lugs adapted to engage the lugs on the steel and lock the steel in driving position.

6. A chuck mechanism comprising a chuck sleeve adapted to be rotated, a chuck bushing carried within said sleeve adapted to receive the shank of a drill steel, and a driver member interlocking with said chuck sleeve adapted to retain a lugged drill steel therein and support the lugs of the latter.

In testimony whereof I affix my signature.

ELMER G. GARTIN.